April 27, 1937.　　　A. W. WENZEL　　　2,078,748

PACKING RING

Filed March 27, 1936　　　3 Sheets-Sheet 1

INVENTOR
Albert W. Wenzel
BY　ATTORNEY
Howard P. Kmia

April 27, 1937.　　　A. W. WENZEL　　　2,078,748
PACKING RING
Filed March 27, 1936　　　3 Sheets-Sheet 2
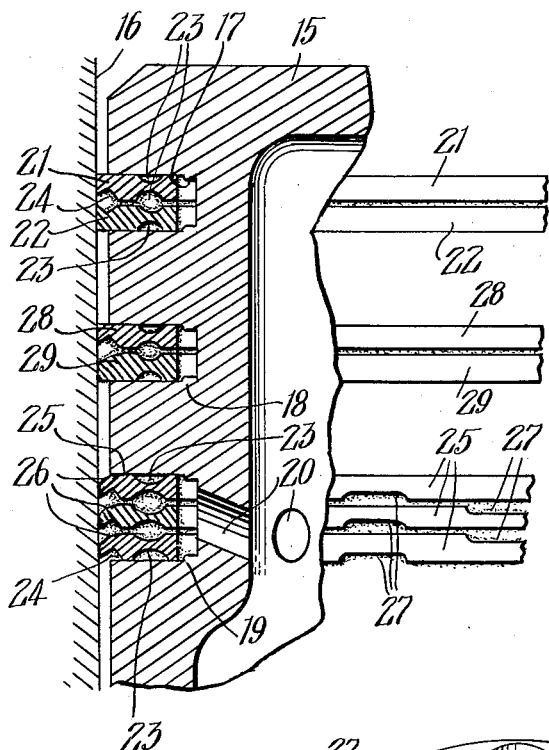
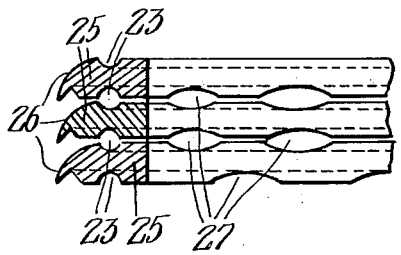
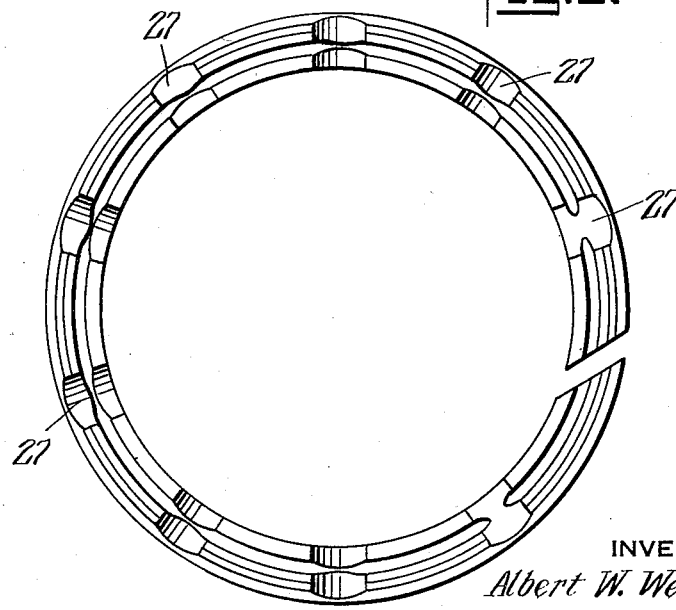
INVENTOR
*Albert W. Wenzel*
BY　　ATTORNEY
*Howard P. King*

April 27, 1937. A. W. WENZEL 2,078,748

PACKING RING

Filed March 27, 1936 3 Sheets-Sheet 3

INVENTOR
Albert W. Wenzel
BY
Howard P. King
ATTORNEY

Patented Apr. 27, 1937

2,078,748

UNITED STATES PATENT OFFICE 2,078,748

PACKING RING

Albert W. Wenzel, West Orange, N. J.

Application March 27, 1936, Serial No. 71,087

12 Claims. (Cl. 309—45)

This invention relates to piston rings, and is a continuation in part of my prior application S. N. 679,195, filed July 6, 1933.

The objects of the invention are to provide an improvement in piston rings which enables one or more sections to be effectively and efficiently utilized in each ring-receiving groove; to obtain improved oil seal where oil is not desired to pass, a better compression seal where that function is desired, as at the compression end of the cylinder, and improved lubrication throughout; to provide a separation of the sections of a multiple-section ring for seating of the sections against the piston lands; to provide for quicker seating, less side friction of the ring, less wear, and silencing of the blow of the ring land on the reverse of the piston stroke; to permit the ring to "breathe" freely; to store lubricant, grit and carbon collected; to transfer the oil freely and take care of excess of oil at one part of the cylinder by spreading to less generously supplied areas; to utilize the ring structure in the groove for distributing the oil; to utilize the rings for actuating the oil along the cylinder surface; to enable the ring to glide over the oil in one direction and actuate the oil in the other direction of piston stroke; to secure simplicity of construction, as well as positive, effective and simple operation; and to obtain other advantages and results as may be brought out in the following description.

Referring to the accompanying drawings in which like numerals of reference indicate similar parts throughout the several views;

Figure 1A is a similar sectional view showing the ring-receiving grooves as they appear after wear has occurred and showing the rings "seated";

Figure 2 is a sectional view of one group of ring sections ready for insertion in place in a piston;

Figure 3 is an inverted plan of one of the sections;

Figure 9:
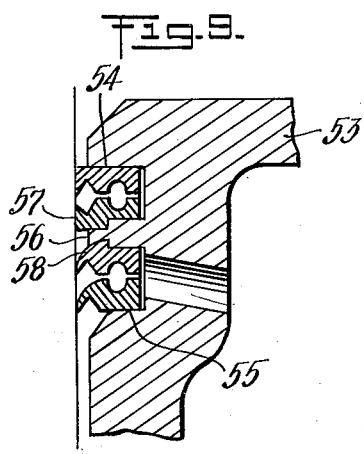
Figure 10:
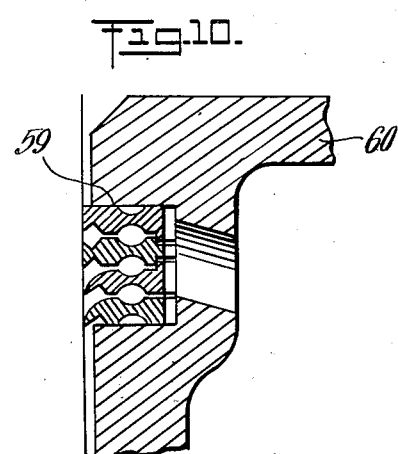

Figures 5, 6, 7, and 8 are sectional views of rings, each including modifications of others;

Figure 9 is another sectional view of a part of a piston with a modified construction both of the piston and groups of ring sections therein; and Figure 10 is a further sectional view of a part of a piston and a group of ring sections therein and showing adaptability of my invention to utilization of both compression and oil-control ring sections all in a single groove.

Figure 1:
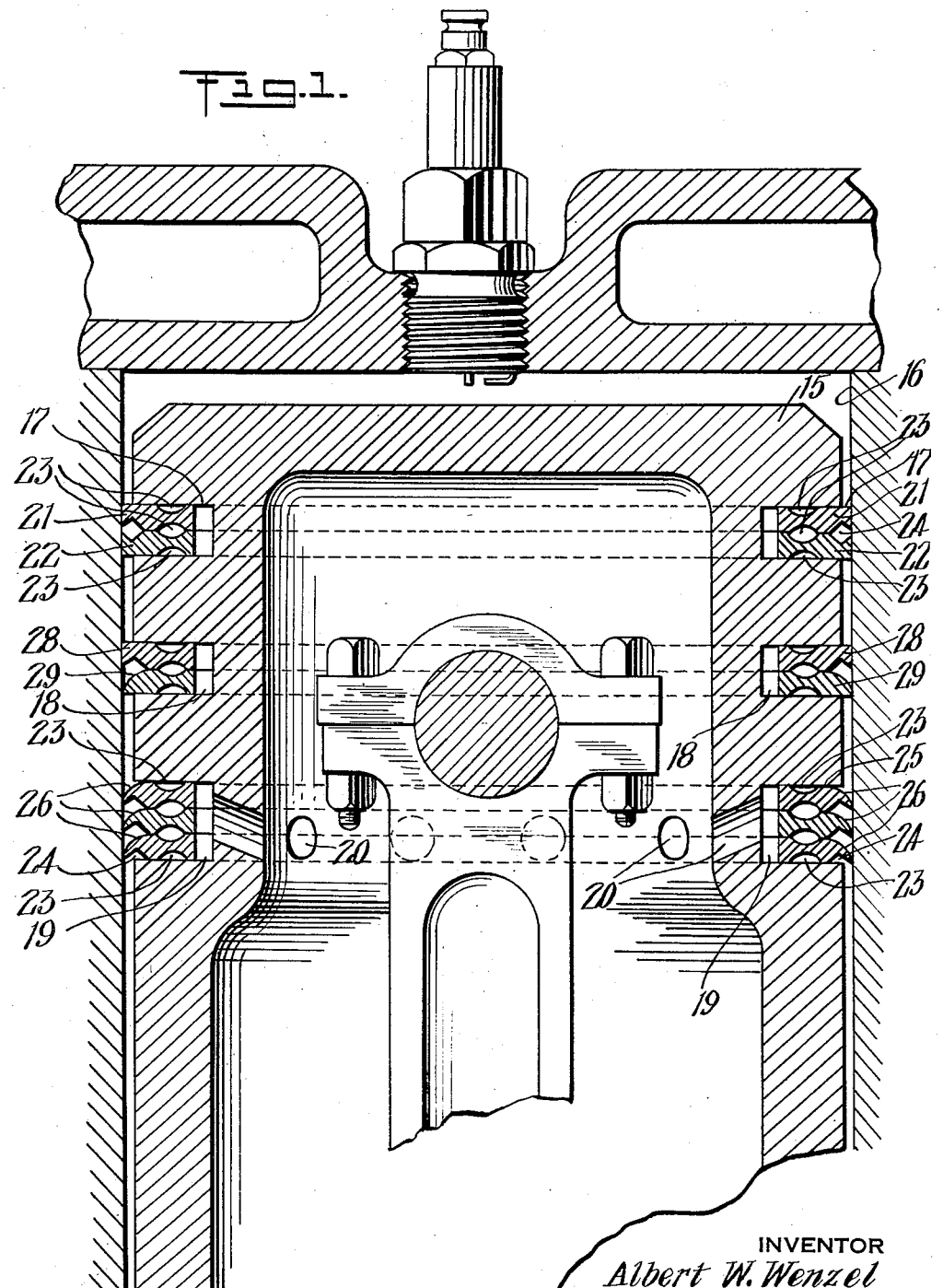
Figure 1 is a sectional view of a part of an engine, particularly that part including the cylinder and piston, and showing rings of my improved construction mounted therein.

In the specific embodiment of the invention illustrated in said drawings, and directing attention initially to the construction of Figures 1-3, the reference numeral 15 designates a piston arranged to reciprocate longitudinally in a cylinder 16. The particular arrangement of parts shown in Fig. 1, shows the closed end of the piston at the top, and the open or crank-end of the piston toward the bottom. Thus, they will be referred to as a matter of convenience of description. In the periphery of the piston is provided a plurality of piston-grooves, that is to say, grooves in the piston for receiving the piston rings. I use this term "piston-grooves" to avoid confusion hereinafter in connection with grooves to be described as formed in the rings. An alternative term often applied to these piston grooves is "ring-receiving grooves". In the present showing, furthermore, are illustrated three such piston grooves, of which the upper one 17 is shown with a sectional compression ring, the next or middle one 18 with a sectional combination ring therein, and the third or lower one 19 with a sectional oil-control ring therein. Drain openings 20 from this lower groove 19 to the interior of the piston are shown to return oil to the crank-case of the engine of which cylinder 16 is a part. If found desirable, the middle groove 19 may likewise have drain openings. The desirability of such drain openings for the middle piston groove depends upon the oil consumption. As to these several piston grooves, let it be said that the same are continuous circumferentially of the piston and normal to the axis of the piston as is usual with piston grooves. The material of the piston next the said grooves, particularly that part providing the plane surfaces of the grooves, is referred to as the "land" and this term applies not only to the material between grooves but to the material just beyond the upper and lower grooves.

Attention will now be given to the compression ring shown in upper groove 17 of Fig. 1. This ring is referred to as the compression ring because it takes the brunt of the compression created by the fuel explosion. A desired characteristic of such a ring is to form a tight seal to the escape of any of the compression. Other characteristics desired are to substantially prevent passage of oil beyond the compression ring. To accomplish these and other desideratums, I preferably employ a ring having a plurality of sections, 21 and 22, such that the ring is divided upon a horizontal plane, that is to say, a plane parallel to the usually plane surfaces or "sides" of the ring. Both sections of this ring, as is the case with all the ring sections hereinafter described, are expanding ring sections, which is understood in the art to mean that the rings are resilient and, if not confined in a cylinder, will have a greater diameter than when confined in a cylinder in use, and it is further to be understood that the term implies that the ring is severed at one part thereof to accommodate the expansion and contraction of the ring to maintain a resilient working contact with the cylinder wall. The ring sections are movable one with respect to the other, and thus, should the force of the explosive compression exert a sufficient moment to contract the upper section 21, thereby permitting compression to pass the section, there will still be the lower section 22 in working contact with the cylinder to deter passage of the compression. The upper outer corners of these ring sections are sharp or acute, and by this term of "acute" corners, I include all angles of 90° or less between the intersecting faces of the ring forming the angle. Thus, the term includes the 90° angle of the upper corner of the upper section, as well as the less than 90° angle of the upper corner of the lower section 22 of this ring.

The said compression ring under discussion composed of sections 21, 22, and located in the upper piston groove 17, as well as the other rings yet to be described in detail, are proportioned with respect to the piston groove to provide adequate clearance therein. The amount of that clearance need not be dwelt upon at length here. Suffice it to say, it is of appropriate amount for the working conditions involved, and thus will include those clearances which this art has come to recognize under the terms of both "normal" clearance and "more than normal" (sometimes also called "abnormal") clearance. The ring sections are therefore free to move in the groove and free to move, as hereinbefore described, with respect to each other.

It is desirable that the ring have lubrication for insuring its free movement within the groove, and it is also desirable that the sections be lubricated between their juxtaposed surfaces. These desideratums are shown accomplished by provision of lubricating or oil-transferring grooves 23 in the upper and lower plane surfaces of each section. Said oil-transferring grooves 23 are preferably cut or otherwise formed to provide a continuous oil passage circumferentially of the ring which extends to both "ends" of the ring, said ends being resultant upon the severance of or transverse split in the ring. Said grooves 23 have appropriate depth to accommodate the desired quantity and flow of oil therein, and are likewise designed to also receive and retain particles of carbon, grit and the like, until carried off, which may enter between the sections or between the ring and the lands. The continuity of groove 23 introduces the advantage of permitting oil to circulate throughout the circular path thus provided in the ring washing out the grit, etc. Flowing oil does not carbonize so readily and cools more effectively. The said grooves 23 are furthermore so placed and related, that the one in the under side of the upper section will register with the one in the upper side of the lower section, thereby providing a circular channel within the ring between the ring sections.

Furthermore, said grooves 23 perform numerous other functions, amongst which may be mentioned those of quicker seating, less side friction, free "breathing" of the ring, remaining of the ring in more constant contact with the cylinder, provision of oil cushions, silencing of the blow of the piston land against the ring at reverse stroke, lessening of groove wear, square seating of the ring in the groove due to symmetry and other advantages.

The cylinder-engaging face of the ring sections 21 and 22, is preferably made less than the overall dimension of the ring. In other words, when the said ring sections are positioned flatwise together, there will be a gap between the two sections circumferentially of the ring at the edge thereof toward the cylinder. That gap never closes, but will increase upon any separation of the ring sections. In the faces of the sections which are juxtaposed to each other in use, and immediately adjacent the outer circumference of the sections, are provided annular recessions 24, which, in effect, constitute enlargement within the ring of the gap at the edge of the ring. The inner part of this enlargement tapers back to the plane of juxtaposition of the sections, and therefore oil forced into said enlargement will tend to wedge its way between the sections. It is to be noted in connection with this compression ring, that both edges of the peripheral gap are acute angles to the cylinder, and therefore the scraping of such small amounts of oil from the cylinder wall as may be left thereupon by the lower rings into the enlargement 24 during movement of the piston occurs in both directions. Also it may be pointed out that the juxtaposed grooves 23, together forming the circular channel mentioned, constitute a reservoir for the oil.

Next, describing the ring disclosed as mounted in the lower one of the three piston grooves of Fig. 1, namely, the ring in piston groove 19, there is shown an oil-control ring consisting of three sections 25. This particular showing illustrates all three of the sections identical one with the other. It likewise illustrates each of those sections as having upper and lower oil-conveying grooves 23 similar to the showing of the oil-conveying grooves 23 in the sections of the compression ring above described, and with the same purposes and effects. The under face of each of these sections 25 of the oil-control ring are likewise provided with an annular recession 24 next the outer peripheral edge of the section, also similar to the corresponding recession 24 in the lower face of the upper section of the compression ring. As before described, this recession forms a sharp scraping edge against the cylinder, and therefore this oil-control ring will scrape substantially all of the oil from the cylinder wall during the down-stroke of the piston, and the action, coupled with the shape of the recession will obtain a pressure and movement of oil radially inward of the ring beneath the surface of the section thereof having the recession. The oil is thus forced into the circular oil passage 23. As this ring is closer to the oil supply for the cylinder wall, a far greater amount of oil is normally scraped from that wall by this oil-control ring than is scraped by the compression ring at the top of the piston. In fact, it is the purpose to scrape substantially all of the oil from the cylinder wall by this ring and leave only enough to be scraped by the other rings thereabove to provide for their lubrication and proper functioning. It is therefore desirable and preferable to provide for the escape of a large part of the oil from this oil-control piston groove 19 through the drain holes 20.

The outstanding difference between the several sections 25 of the oil-control ring and the upper section of the compression ring as shown in Figure 1, is to be found in the provision of rounded corners at the upper outer edges of those sections. These rounded corners are, when viewed in cross-section, upon a radius of a length preferably not less than the thickness (axially of the ring) of the ring section, and preferably exceeding the said thickness. Thus, the center of curvature is not within the area occupied by the ring, and the peripheral scraping surface is initially (that is, upon installation of the ring in a motor, as in Fig. 1) at an angle to the wall of the cylinder at the lower outer edge portion of the section. This provides for quick seating of the ring, shown accomplished in Figure 1A, by permitting rapid wear to create an outer periphery on the ring in surface engagement with the cylinder. Furthermore, the curved or "radius" edge enables in use that on the up-stroke of the piston, the ring section will tend to glide over the oil with minimum scraping action. This ring accordingly tends to scrape oil back toward the crank-case end of the cylinder. The rounded edge, combined with the opposed tapering of the adjacent recession 24 of the ring section thereover, will obtain the wedging action of the oil to enter between sections similar to the action as described in connection with the compression ring. While corners 26 of the oil-control ring have been described as to the one specific showing appearing in the drawings, it is to be understood that the invention contemplates broadly the provision of a corner which glides, at least to some extent, over the oil, as distinguished from the positive maximum scraping obtained with an acute angle. Thus, a degree of gliding may be obtained where the corner is chamfered, either strictly frustro-conical in shape, or a modification of such shape, as by convexing or concaving the chamfer.

A further characteristic of the oil-control ring, as clearly illustrated in Figures 1 to 3, resides in the provision of transverse or radial flow passages or depressions 27 in one or more of the plane faces of the ring sections. Figure 1 shows passages 27 in the top and bottom faces of all sections except the top face of the upper section. Figure 2 shows such passages in the top and bottom faces of all the sections except the top face of the upper section, but with the passages in juxtaposed faces arranged to register as distinguished from the staggered positioning thereof in Fig. 1. These transverse or radial passages 27 each cross the circular oil-transferring grooves 23, and the invention contemplates the provision of such intersecting grooves regardless of what depth may be given to either. As shown particularly in Figure 3, all except the two transverse grooves nearest the split of the ring are shown substantially the depth of but perhaps a little less deep than the circular groove, whereas the two end transverse passages are shown substantially the depth of but perhaps a little deeper than the circular passage. This showing is made as indicative of the fact the depth may be varied one way or the other as desired, or a combination of depths employed. By tapering the circular passage to less depth as it approaches the split in the ring, a tendency will be exerted to have the oil flow away from the split, in the equalization process, and thus pass less oil in the cylinder beyond the ring. The quantity of oil upon a cylinder wall is quite irregular, and by virtue of the intersecting passages in my improved ring, the excesses may be received and distributed by flowing around the circular passage. Thus I accomplish an equalization of the oil received so as to dispose of it most effectively, and at the same time I maintain as nearly as possible an even spreading force throughout the juxtaposed areas of the sections. Sinking of the circular oil passage to a depth greater than the depth of the several transverse oil passages is preferable, in that it allows the oil to flow freely from the overloaded transverse passages to those adjoining. I wish to point out at this time, likewise, that it is preferable to provide the circular oil passage as well as the transverse oil passages with rounded bottoms and rounded transitions to the outer or plane faces of the sections (as viewed in cross-section of the respective passages) in distinction from angular or flat bottoms and corners, so as to maintain the strength of the ring section and give it all possible re-enforcement. This applies as to all the rings shown in the drawings.

In the middle piston groove 18, Fig. 1, is shown what may be termed a combination ring, here illustrated as comprising two sections, the upper one 28 of which is substantially identical with the upper section of the compression ring, whereas the lower one, 29, is shown substantially like one of the sections 26 of the oil-control ring. It is, therefore, a combination compression and oil-control ring, for assisting in reduction of oil consumption without affecting the compression seal.

Figure 1 illustrates more especially pistons and rings as they appear when both are new. Figure 1A is a showing of a piston and rings after a period of use. It will be observed in Fig. 1A that the rings have not only worn off the outer edges so as to "seat" as above described, but the piston-grooves have worn to become wider where the rings have rubbed. As there is a minimum of relative movement between the ring sections, however, the juxtaposed surfaces of the ring sections will each acquire a hard coating of carbon, grit, and the like, with an equal rapidity to the wear of the grooves, and the substantial fit of the ring is thus maintained. Stippling in the exaggerated crevices in Fig. 1A, indicates such coating.

Figure 4:
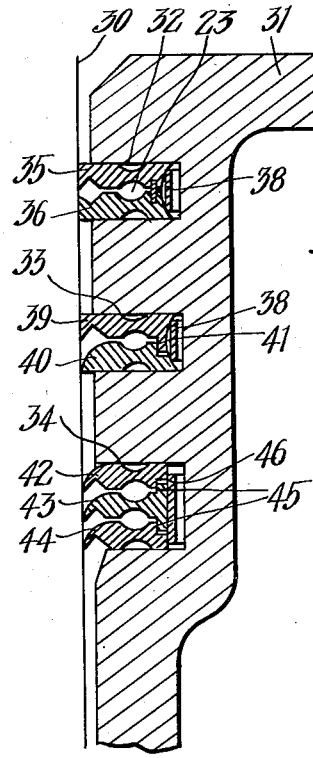
Figure 4 is a further sectional view of piston and cylinder portions. with a modified construction of rings mounted therein.

Referring now to Fig. 4 of the drawings, I have again shown a portion of a cylinder 30 and piston 31. The piston has piston-grooves 32, 33 and 34 similar to those described in connection with Fig. 1. These piston-grooves, as before, have compression, combination and oil-control rings mounted therein. The rings of Fig. 4 differ essentially from those shown in Fig. 1 by provision of means for trapping oil between the sections. By thus keeping the flow of oil between the sections from passing to the bottom of the piston-groove, an effective spreading pressure of the oil is obtained and the ring becomes hydraulic in action.

Various means may be employed for trapping the oil. For instance, in the compression ring of Fig. 4 located in the upper groove 32, the sections 35, 36 near their inner peripheries and in juxtaposed faces, may have circular registering mortises. A circular split ring-like tenon 37 of steel or other suitable material, stands edgewise in the mortises, spanning any gap which would otherwise occur between the sections. The ring-like tenon 37 has sufficient freedom with respect to the mortises to permit the sections to spread or return to close relationship as required, and yet is tight enough to prevent passage of oil. The little oil which may escape through the split of this tenon is negligible.

The inner peripheral face of this compression ring is shown to be concave, the part of the curvature inward from the upper edge of the ring being all in the upper section, and the part of the curvature inward from the lower edge of the ring being all in the lower section. An expander "ring" 38 (circular, octagonal or otherwise as usual) when placed within the concave inner periphery of the piston ring will tend to spread the sections apart.

Also in Figure 4, located in the middle piston groove, is a combination ring composed of upper and lower sections 39, 40. The means employed in the showing of this particular ring to trap the oil comprises a mortise-like step 41, in each section, said steps interfitting. An expander 38 may be provided in this assembly also.

Again in Figure 4, in the lower piston-groove 34, is shown a hydraulic oil-control ring composed of three sections 42, 43 and 44 of which the middle one, 43, has positive steps 45 next its inner periphery, said steps being directed one up from the top face of the section and the other downward from the lower face. The upper section 42 has a receding or negative step interfitting the upwardly projecting positive step of the middle section, and the lower section has a similar receding or negative step interfitting with the downwardly projecting positive step. An expander 46 is shown at the inner peripheral surface of this ring, said expander preferably being wide enough to engage all three sections.

Figure 5:
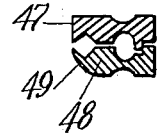

Figure 5 is a cross-section of another hydraulic ring composed of upper and lower sections 47, 48. This ring provides a positive step in one section, as 48, interfitting with a negative step formed in the other section. This figure is essentially to illustrate a ring with a rounded lower edge 49 next the cylinder by which an increased quantity of oil may be left upon the cylinder wall, where otherwise insufficient, to be scraped into the gap between the sections. Such a ring may be employed either as a compression ring or as a combination ring, that is to say, may be used in either the upper or next to upper piston grooves to advantage. Its more likely use is in the upper groove. However, where a condition is encountered requiring some of the oil contacted by the oil-control ring to be positively retained upon the cylinder, this type of section with the rounded or radius edge downward may also be employed in connection with the bank of oil-control rings in the lower piston groove. The ring is one enabling the top of the ring to thoroughly seal the compression and the bottom to utilize oil on the cylinder wall for lubrication purposes, where the oil is otherwise insufficient. As the acute edge moves forward, it scrapes the oil, and as the radius edge moves forward, it glides over and leaves the oil upon the cylinder wall.

Figure 6:
Figure 7:
Figure 8:

Figures 6, 7 and 8 are presented more especially for illustrating various types of tenons or oil-trapping means for sectional rings. For instance, in Fig. 6, the tenon 50 is tensioned and tends to decrease in diameter. In Fig. 7, the tenon 51 is likewise tensioned and tends to increase in diameter as does also tenon 52 of Fig. 8. By virtue of bevels on the tenon and ring sections in the construction of Fig. 8, the tension of the tenon likewise tends to separate the ring sections axially. In all three of these instances the tensioning of the tenon exerts a seating actuation in the tenon.

When the space is limited, or to secure a shorter piston 53, the grooves 54, 55 in the piston for the compression and oil-control rings may be made close together, as in Fig. 9, with a narrow stepped land 56 therebetween. Sections 57, 58 of the rings next the stepped land are correspondingly stepped.

In Fig. 10 is illustrated a construction demonstrating that the invention contemplates inclusion of compression and oil-control rings all within a single groove 59 of a piston 60, if so desired.

Although in the foregoing description as well as in the drawings I have set forth only certain exemplifications of the inventive concept by way of illustration thereof, it is to be understood that other examples, modifications and changes may be made in the construction, manufacture and use of my invention, and I do not wish to be considered as limiting myself to the specific exemplifications except as set forth in the following claims when construed in the light of the prior art.

Having thus described the invention, I claim:—

1. A piston ring comprising juxtaposed sections having contiguous side walls and circumferential cylinder-engaging walls, said sections having an annular channel therein opposed portions of which are in the respective sections, the channel being inset from the respective circumferential walls enabling oil entering between the sections to be received, and distributed in said channel, one of said sections having a circular recession for collecting oil, said recession and one portion of the annular channel both being in one of said contiguous walls.

2. A piston ring according to claim 1 having radial grooves between said channel and recession for passing oil from one to the other.

3. A piston ring according to claim 1 having radial grooves from the circular recession to the said annular channel and having radial grooves from said annular channel to the inner circumference of the ring for passing oil from the annular channel.

4. A piston ring according to claim 1 having radial grooves entirely crossing the contiguous portions of said edges and intersecting said annular channel.

5. A piston ring according to claim 1 having radial grooves from the recession wherein the annular channel differs in depth from the depth of said radial grooves.

6. A piston ring according to claim 1 having radial grooves from the recession wherein the annular channel is of less depth than the depth of said radial grooves.

7. A piston ring according to claim 1 having radial grooves from the recession wherein the annular channel is of greater depth than the depth of said radial grooves.

8. A piston ring comprising juxtaposed sections, said sections having a channel therein opposed portions of which are in the respective sections enabling oil entering between said sections to enter said channel and spread the ring, said sections having a tenon interengagement next the inner circumference of the ring for enabling the oil to build up pressure within the channel.

9. A piston ring according to claim 8 wherein the tenon interengagement is by interfitting integral parts of the said sections.

10. A piston ring according to claim 8 wherein the tenon interengagement is by a tensioned tenon distinct from the said sections and interfitting with both sections.

11. A packing ring comprising sections which together provide an outer cylinder-engaging surface, said surface having a groove therein between the sections and one wall of said groove being convex for rendering the same oil-passing and the other wall of said groove having an acute angular relationship with respect to the outer wall for rendering said other wall oil-conveying, said oil passing and oil conveying surfaces enabling an oil supply to build up for entry into said groove in use, said sections having circular engaging areas inward of said groove and having walls converging toward each other and leading to said engaging areas for enabling the oil to wedgingly enter between the said areas.

12. A packing ring comprising sections which together provide outer cylinder-engaging surface, one of said sections having a recession next its cylinder-engaging surface, which recession tapers inwardly upward and then inwardly downward at substantially equal angles so as to form an acute angle scraping edge at said surface and so as to form in the inward direction a surface offering minimum obstruction to passage of oil.

ALBERT W. WENZEL.